United States Patent [19]

Cottell

[11] 4,273,078
[45] Jun. 16, 1981

[54] FUEL SUPPLY SYSTEM

[76] Inventor: Eric C. Cottell, Private Rd., Bayville, N.Y. 11709

[21] Appl. No.: 968,582

[22] Filed: Dec. 11, 1978

[51] Int. Cl.³ .............................................. F02M 37/00
[52] U.S. Cl. ............................... 123/25 R; 123/25 A; 123/25 E; 123/25 C
[58] Field of Search ................. 123/25 A, 25 C, 25 E, 123/25 R; 137/171, 204

[56] References Cited

U.S. PATENT DOCUMENTS 3,818,876  6/1974  Voogd ........................... 123/25 E X
4,031,864  6/1977  Crothers ........................ 123/25 A X Primary Examiner—Alan Cohan
Attorney, Agent, or Firm—Nolte & Nolte

[57] ABSTRACT

A fuel supply system comprises a supply tank with a main fuel conduit leading to a combustion zone, such as an internal combustion engine, and a secondary fuel conduit with flow restriction means is provided leading from the lowermost region of the tank to rejoin the main fuel conduit prior to the combustion zone so that any water accumulating in the tank is mixed with fuel to be burned at the combustion zone.

1 Claim, 1 Drawing Figure

FUEL SUPPLY SYSTEM

BACKGROUND OF THE INVENTION

This invention is concerned with liquid hydrocarbon fuel systems and it is particularly, but not necessarily exclusively, concerned with fuel supply systems for internal combustion engines such as diesel engines.

The presence of water in a fuel supply tank has long been recognized as a problem. The water may be inadvertently included in the fuel as the fuel is delivered to the tank or it may be condensed from the air in the tank above the fuel level. Conventionally the conduit leading from the tank to the combustion site, which may be the cylinders of an internal combustion engine, exits the fuel tank slightly above the lowermost region of that tank so that the water which collects at the bottom of the tank is not delivered to the combustion site. However, the accumulation of water may be so great that water does reach the conduit and cause combustion to cease at the combustion site. Additionally, bacteria included in the water tends to multiply, feeding on the fuel, and produce sludge in the tank which may foul the supply system.

The present invention seeks to avoid these problems.

BRIEF SUMMARY OF THE INVENTION

According to this invention there is provided a fuel supply system in which a secondary conduit opens to the lowermost region of the fuel supply tank and is connected to the main fuel conduit means leading to the combustion site. The secondary conduit has flow restriction means, such as, for example, a restriction orifice, so that a relatively small part of the fuel flow to the combustion site is made up of materials continuously passing along the secondary conduit. In this way any water accumulating in the lowermost region of the tank is continuously delivered to the main fuel conduit means but in such small proportions as not to interfere with combustion at the combustion site. In the absence of water in the tank, of course, only fuel would be passed along the secondary conduit.

It will be appreciated that the invention is applicable to any fuel supply system but it is particularly applicable in the fuel supply system to an internal combustion engine and that engine may be of the kind which is supplied conventionally or of the kind such as that described in my co-pending application, Ser. No. 2,626 filed Jan. 11, 1979 in which water is deliberately mixed with the fuel prior to admission of the fuel to the cylinders of a engine and is emulsified so that a fuel/water emulsion is burned.

DESCRIPTION OF THE DRAWINGS

The single FIGURE of the drawings shows, schematically, a fuel supply system according to the present invention.

DESCRIPTION OF THE PREFERRED EMBODIMENT

Figure 1:
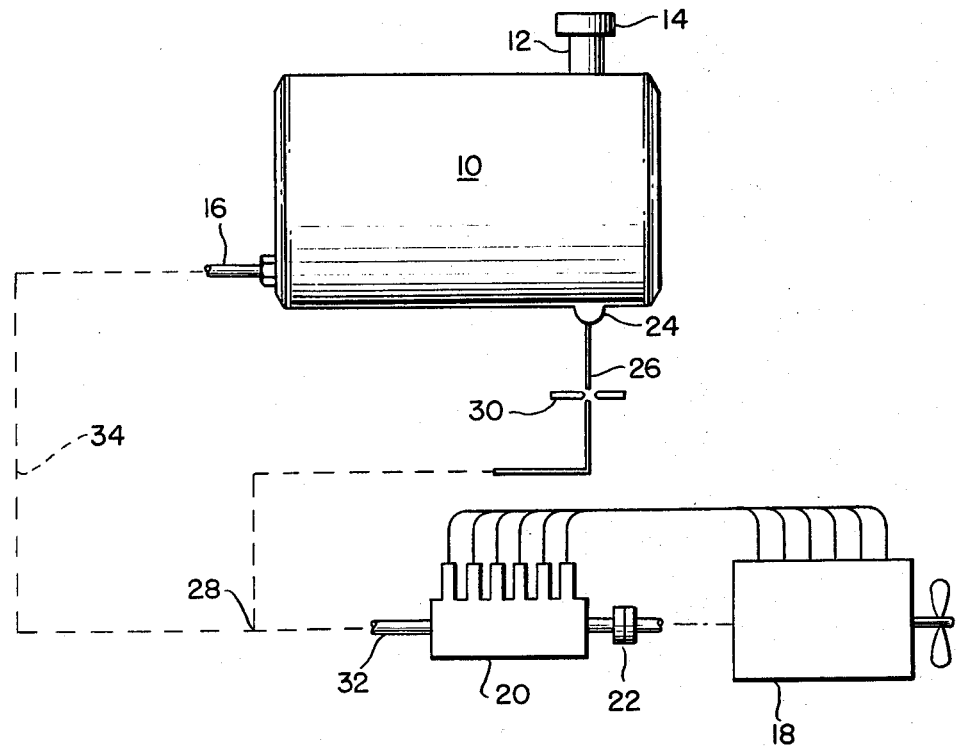

In the fuel supply system of the drawings a supply tank 10 has a filler nozzle 12 and cap 14. A main fuel supply conduit 16 leads from the tank 10 to an internal combustion engine at 18. The engine 18 is in this instance a diesel engine and the main conduit 16 includes fuel injection pumps 20 driven, through an appropriate coupling 22, by the engine 18.

The tank is provided with a small well 24 which constitutes the lowermost portion of the tank and is designed so that any water in the fuel tends to migrate to that well. From well 24 a secondary conduit 26 leads to main conduit 16 at junction 28. The conduit 26 is provided with a restricting orifice 30. It will be appreciated that a relatively small part of the total liquid flowing in section 32 of the main conduit 16 will be delivered along secondary conduit 26, the major components of the flow through section 32 being delivered through section 34 of the conduit 16. The flow through secondary conduit 26 will be constituted by fuel and any water in the tank which accumulates at well 24. Any water reaching the pump 20 will be intimately mixed with the fuel and will not interrupt the combustion in the cylinders of engine 18 and on the contrary, may improve that combustion.

In certain instances it may be desired positively to mix water with the fuel delivered to the engine 18 and in that case a separate water supply tank connecting to the main conduit would be provided as described more fully in my aforementioned co-pending application.

By the adoption of the arrangement herein described it will be appreciated that water is prevented from accumulating to a level at which it may be delivered to the engine along a main conduit 16 and, since it is continuously removed from the tank to be burned in the cylinders of the engine, the build-up of bacteriological sludge is avoided.

What is claimed is:

1. A fuel supply system for a diesel engine comprising a fuel injection pump, a supply tank, a main fuel conduit means leading from the tank to said injection pump for supplying oil to the combusiton chambers of the diesel engine and a secondary fuel conduit leading from the lower-most region of the tank to said main fuel conduit means upstream of said injection pump, said secondary fuel conduit including flow restriction means and constituting means for continuously delivering water of condensation or accidentally injected in the tank or in the absence thereof a small part of the fuel delivered to said injection pump to be mixed with the major part of the fuel delivered to said injection pump along said main fuel conduit means, said conduits and said pump comprising means for removing any water in the lowermost region of said tank and for emulsifying the same with the fuel delivered along said main fuel conduit means, whereby the build-up of bacteriological sludge in said tank is avoided and pure oil is delivered to said injection pump through said conduits when water of condensation or accidentally injected in the tank is not present in the tank.

* * * * *